US006259222B1

(12) United States Patent
Kira

(10) Patent No.: US 6,259,222 B1
(45) Date of Patent: Jul. 10, 2001

(54) DEVICE AND METHOD FOR REGULATING MAXIMUM LOADING ON AN ELECTRIC MOTOR IN AN AGGREGATE FEED REPLENISHING SYSTEM

(76) Inventor: Alan K. Kira, 1327 Kam IV Rd., Honolulu, HI (US) 96819

(*) Notice: Subject to any disclaimer, the term of this patent is extended or adjusted under 35 U.S.C. 154(b) by 0 days.

(21) Appl. No.: 09/513,077

(22) Filed: Feb. 25, 2000

Related U.S. Application Data

(60) Provisional application No. 60/122,090, filed on Feb. 26, 1999, and provisional application No. 60/146,357, filed on Aug. 2, 1999.

(51) Int. Cl.[7] .......... G05B 19/25; B02C 11/08

(52) U.S. Cl. .......... 318/571; 318/39; 318/98; 318/433; 318/671; 241/35; 241/63

(58) Field of Search .......... 318/571, 99, 98, 318/433, 432, 434, 601, 603, 671, 39, 3, 4, 50, 51; 241/35, 64, 63, 30; 700/29, 30, 33, 46, 74, 73

(56) References Cited

U.S. PATENT DOCUMENTS

| | | | |
|---|---|---|---|
| 3,459,378 | 8/1969 | Hill . | |
| 3,904,857 | 9/1975 | Sandblom . | |
| 3,962,619 | 6/1976 | Nishimura et al. . | |
| 4,237,408 | 12/1980 | Frecka . | |
| 4,249,113 * | 2/1981 | Werner | 318/39 |
| 4,267,981 | 5/1981 | Rowland, Jr. . | |
| 4,386,305 | 5/1983 | Kohzai et al. . | |
| 4,406,605 | 9/1983 | Hand . | |
| 4,449,670 | 5/1984 | Tloczynski et al. . | |
| 4,478,009 * | 10/1984 | Rukavina et al. | 51/165.8 |
| 4,597,535 | 7/1986 | Fontanille . | |
| 4,616,786 | 10/1986 | Riker . | |
| 4,635,858 | 1/1987 | Welch et al. . | |
| 4,804,148 | 2/1989 | Etheridge . | |
| 4,983,899 | 1/1991 | Komatsu et al. . | |
| 5,019,763 | 5/1991 | Komatsu . | |
| 5,170,949 | 12/1992 | Buck et al. . | |
| 5,803,376 * | 9/1998 | Koyanagi et al. | 241/36 |
| 5,833,150 | 11/1998 | Koyanagi et al. . | |

* cited by examiner

*Primary Examiner*—Robert E. Nappi
*Assistant Examiner*—Edgardo San Martin
(74) *Attorney, Agent, or Firm*—Shlesinger, Arkwright & Garvey LLP

(57) ABSTRACT

A device for controlling load on a first motor whose load is affected by a second motor, comprises a controller having a first input for being connected to a horsepower transducer connected to the first motor being monitored and an output for being connected to the second motor; and a program configured to receive the first input and generate the output responsive to the input.

23 Claims, 12 Drawing Sheets

DEVICE AND METHOD FOR REGULATING MAXIMUM LOADING ON AN ELECTRIC MOTOR IN AN AGGREGATE FEED REPLENISHING SYSTEM

RELATED APPLICATIONS

The present application is a nonprovisional application of provisional applications serial nos. 60/122,090 filed Feb. 26, 1999 and 60/146,357 filed Aug. 2, 1999, which are both hereby incorporated by reference.

FIELD OF INVENTION

The present invention pertains generally to a control apparatus and method for controlling the operation of a processing system such as an aggregate replenishing system, and particularly to a programmable controller not using PID (proportional, integral and derivative) type control scheme to control the loading on an electric motor driving a rock crusher in an aggregate production plant.

BACKGROUND OF THE INVENTION

Processing facilities throughout the world largely depend on automatic control systems that primarily work off higher level mathematical formulas and complex algorithms. Most popular among them is the PID feedback controller. Process control environment is basically separated into two worlds; namely, the controller world which comprises the processing intelligence, and the process world where the actual mechanics of the process takes place.

A traditional PID process control is shown in FIG. 1. A setpoint SP is selected as the target at which to continuously run the process. A sensor 2 is attached to an output element 4 to provide process information, referred to as the feedback signal. This information is manipulated in the same unit as the SP by a math function unit 6. A PID 8 reacts to the difference, called the error signal, between SP and the process variable PV, by adjusting the output signal to compensate for the error. This circuit is referred to as the process loop. The error, output, and PV (and in some cases, SP) signals are a function of time f(t).

PID stands for the three main elements of a mathematical equation, namely, proportional, integral and derivative, from which the controller generates decisions and subsequent output signal. A theoretical equation of the PID is presented below to show the level of mathematics involved, and to demonstrate the level of skill and knowledge required to truly understand, appreciate, and use controllers based on PID.

The equation appears below:

$$\text{P element I element D element } O=A\Delta(t)+B(\int\Delta(t)dt)+C(d\Delta(t)/dt),$$

where, error signal$\Delta$=Setpoint−Process Variable.

Controller output is O. A, B, and C are constants which help to adjust or trim the influence, or effect of each element on the output signal. The value of these constants are directly related to the process physical characteristics the controller will be regulating.

PID controllers though widely used throughout the industry is seldom understood by all users mainly because of their extensive mathematically oriented mechanisms that govern its operation. Although mathematically oriented, it is difficult to configure the PID for a particular application based on calculations alone. Perhaps the most convenient way is through trial and error, and obviously, experience. As a result, not many users have the knowledge base to configure the PID for optimum process control even after many hours of use. Improvements, theories, and enhancements to make the PID more practical are still evolving through the years.

Present process control methods rely heavily upon higher level mathematics and algorithms, imaging the controller world orientation, coupled with advanced automation theory and control techniques. They can be extremely difficult to understand and therefore use. The synthesized model has to account for every conceivable situation for it to react properly to the process it attempts to control.

Regulating feed replenishing is a very common task found in every processing facility in the aggregate industry. Feed replenishing simply means to put-back material into the system, at a rate at which consumption equals output to sustain a desired throughput, or flow rate. It is applied to conveyors crushers, screens, bucket elevators, horizontal screws, etc.

Process control can be as simple as providing a high current alarm to inform the operator that the process had ventured beyond the limits of the electrical system's ability to provide energy for the additional burden or as formidable as including many sensors, level, temperature, pressure, etc., along with monitoring motor load into the process loop. Continuous process controllers provide the main means of feed regulation. These controllers are almost always PID, or PID based.

Owing to the complexity of precisely configuring the PID, it is not uncommon to find present users with the following typical frustrations:

A. PID control often results in large oscillatory swings on start-ups and during substantial disruptions in the PV, which could lead to equipment failure. It can have a tendency to overcorrect or undercorrect when it is extremely urgent to not do so.

B. PIDs require constant tuning. Because the PID is basically a mathematical model, unless the conditions which caused or permitted the equation to balance initially remains absolutely the same, the output cannot produce the same results when those conditions have changed, or are changing. The mechanics of processing systems in the aggregate industry are notoriously known to wear. Crusher liners begin to wear down the minute they are subjected to work. Bearing, rollers, and gears wear.

Another variable is the very feed material that the aggregate facility processes. Aggregate feed material seldom remains exactly the same from day to day, even hour to hour. The composition of the material changes. Particle size changes. And, for an aggregate crusher system, particle size change does matter. If the PID is set-up, tuned or configured with large size rock going through the crusher, it will certainly be most ineffective at maintaining the process when the feed material changes to smaller sized rock, because it requires more power to crush smaller rock than it does larger rock, assuming, however, that material has remained the same. Coupled with changing particle size, material density changes. If the PID is set-up, tuned or configured with softer rock, it will become ineffective in maintaining the process when the rock becomes harder. The obvious reason is that it takes more power to crush the same volume of hard rock than it would the softer rock. The PID based controller tuned to soft rock would be too sluggish dealing with hard rock. The combined effect of all these variables can be very frustrating for the users of PID based controllers and sometimes devastating on system mechanics.

With a variety of variables that a process controller is exposed to in aggregate processing, it is no wonder that the once tuned-to-peak-performance PID eventually becomes ineffective, de-tuned, and sluggish.

C. Precise PID configuration is complex. The output is the result of analytical calculations, dependent upon proportional, derivative, and calculus integral elements coupled with control algorithms. It is doubtful whether every PID user completely understands it and can therefore configure the PID for optimum process control performance. It is also doubtful whether every PID user understands the effect of each variable in the processing mechanics on the PID.

D. Furthermore, the magnitude of frustration magnifies exponentially when the task or application requires the use of multiple sensors into one PID controller. Anything short of optimum process control will inevitably result in inefficiency, production problems, and ultimately lost revenue as a function of time. And the magnitude is amplified when attempting to control a process at maximum loading.

There is, therefor, a need for an alternative to PID-based control in most present process control applications that utilize the PID to regulate physical quantities such as pressure, temperature, acceleration, revolutions per minute, flow rate and etc.

The present invention provides a simple method of process control, not involving high level mathematics, error signals, external setpoint, and PID process control methodology.

OBJECTS AND SUMMARY OF THE INVENTION

It is an object of the present invention to provide a nonmathematically-intensive apparatus and method for process control.

It is another object of the present invention to provide an apparatus and method for process control that exercises a simple deterministic process, for the feed steering algorithms, in place of advanced higher level math and logic found in today's PID based controllers.

It is still another object of the present invention to provide a non PID means of regulating motor loading for process control.

It is yet another object of the present invention to provide a controller that does not depend on the proportional, integral and derivative elements found in PID control.

It is still another object of the present invention to provide a controller that does not depend on a reaction to an error signal, defined as SP−PV=error.

It is another object of the present invention to provide a controller and method that eliminate large oscillations in motor loading associated with PID control.

It is another object of the present invention to provide a controller and method that minimize or eliminate the need for re-tuning the controller for optimum performance.

It is still another object of the present invention to provide an apparatus and method that eliminate the need for high level mathematics and logic skills in understanding, configuring, and using process control.

It is another object of the present invention to provide a controller and method that controls an aggregate feed replenishing process at maximum loading or at peak throughput using horsepower as the primary sensor.

It is still another object of the present invention to provide a controller and method that use secondary sensors to detect alarm conditions within the process that is not known to the primary sensors and use the information from the secondary sensors to maintain process control stability.

It is an object of the present invention to provide a controller and method that controls an aggregate feed replenishing process at maximum loading or at peak throughput using horsepower as the primary sensor without an external setpoint, SP.

It still another object of the present invention to provide a controller and method that use the electric motor's inherent electrical/physical characteristic to react with load impressed upon it to provide the basis of regulation decisions rather than depend upon a synthetic model based on higher level mathematics and sophisticated algorithms, since an electric motor will draw energy from the service lines in direct relationship to the work that is required out of it by the processing system to which it is mechanically connected.

It is another object of the present invention to provide a controller and method that is process world oriented rather than controller world.

It is still another object of the present invention to provide an apparatus and method that will maximize motor loading with the main feed steering algorithm that is open to multiple sensors; not requiring the use of separate feedback loops used in PID based controllers, and separate tuning for each sensor, but utilizing the same primary feed steering algorithm for all inputs.

In summary, the present invention provides a device for controlling load on a first motor whose load is affected by a second motor, comprising a controller having a first input for being connected to a horsepower transducer connected to the first motor being monitored and an output for being connected to the second motor; and a program configured to receive the first input and generate the output responsive to the input. The program comprises a first counter for accumulating the number of occurrences within a block of time the first input is above an upper limit, a second counter for accumulating the number of occurrences during the block of time the first input is between the upper limit and a lower limit, a third counter for accumulating the number of occurrences during the block of time the first input is below said lower limit, and a fourth counter for accumulating the total number of occurrences of the first input in the said first, second and third counters during the block of time. The program comprises generating a percentage of the number of occurrences in the first counter relative to the total number of occurrences, and if greater than a predetermined value, decreasing the output, thereby to slow down the second motor. If the percentage is below the predetermined value, and if the number of occurrences in the second counter is less than the number of occurrences in the third counter, the output is increased, thereby to speed up the second motor. If the percentage is below the predetermined value, and if the number of occurrences in the counter is more than the number of occurrences in the third counter, the output is maintained at the present level, thereby to maintain the present speed of the second motor.

These and other objects of the present invention will become apparent from the following detailed description.

DETAILED DESCRIPTION OF THE INVENTION

For purposes of describing the present invention, focus will be made on an electrical motor operated aggregate crusher feed replenishment system; however, it should be understood that it is not restricted to just the crusher application. There are many other feed replenishing circuits within an aggregates process facility, such as loading conveyors, horizontal screws, bucket elevators, and screens, etc. to which the present invention may be applied, as well as other applications requiring process control.

It is common knowledge throughout the industry that perhaps one of the most dependable indicators of a process is motor loading, as for example, when an electric motor is used as the prime mover of an aggregate feed replenishing system, or any portions therein. Motor loading reflects the resultant, total effect of the mechanical system interaction with the feed material, influenced by the variables. Motor loading is current or power draw from the electrical lines. It refers to the work, in horsepower, required of the motor by the physical forces impressed upon it via the processing system to which the motor is operably connected. It is common to find an electric motor as the prime mover in processing systems. Motor loading is used as the primary control element in the present invention, although it is not limited to it. The present invention applies simple non-PID control techniques to regulate maximum loading on an electric motor which is the prime mover of an aggregate feed replenishing system without using sophisticated mathematics.

The present invention will be applied to maximize loading of a processing system using horsepower as the primary sensor, combined with data from secondary sensors, such as temperature and material level, providing additional back-up information to help maintain process control to a high degree of stability while regulating the process under maximum loading.

Figure 1:
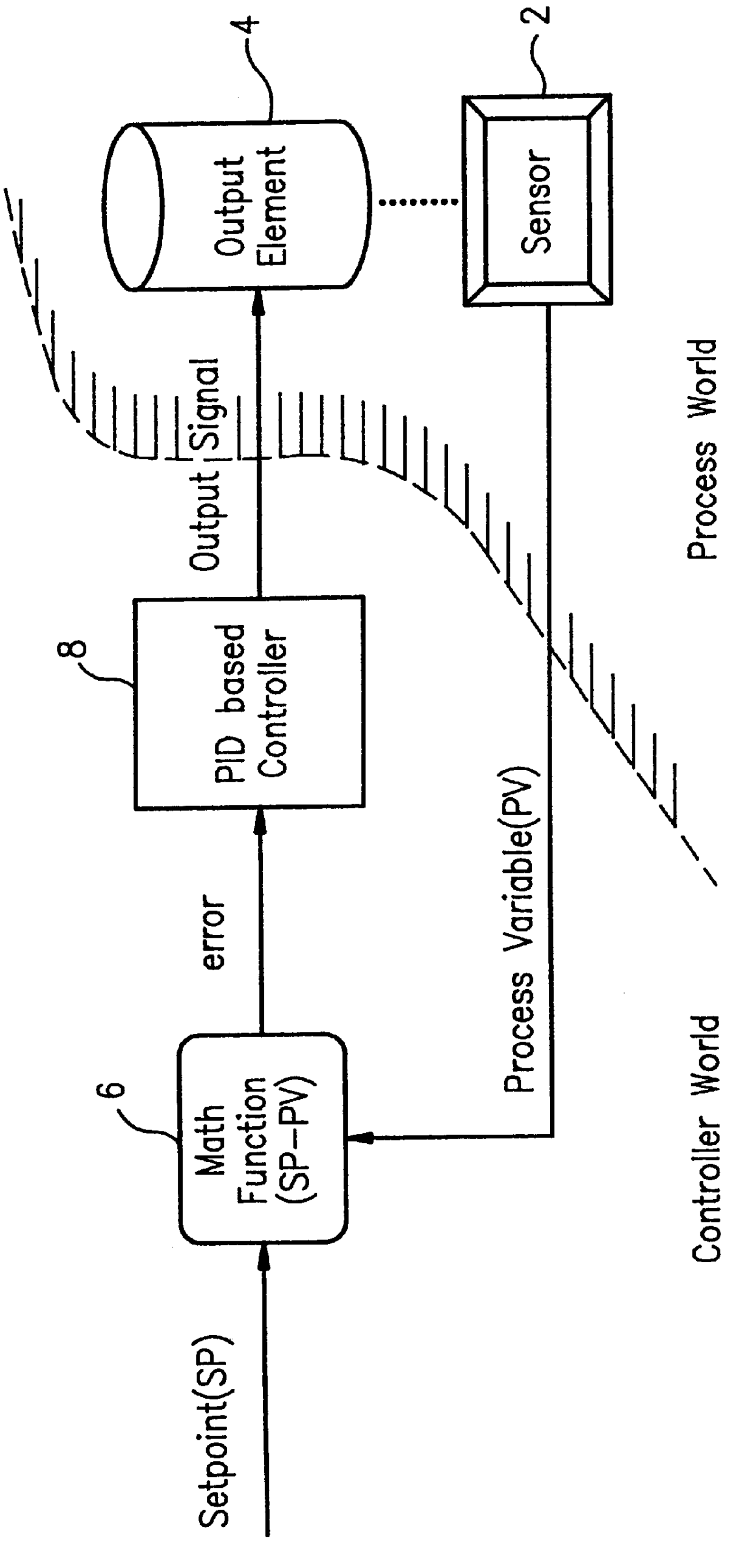
FIG. 1 PRIOR ART
FIG. 1 is a schematic block diagram of a process system.
Figure 2:
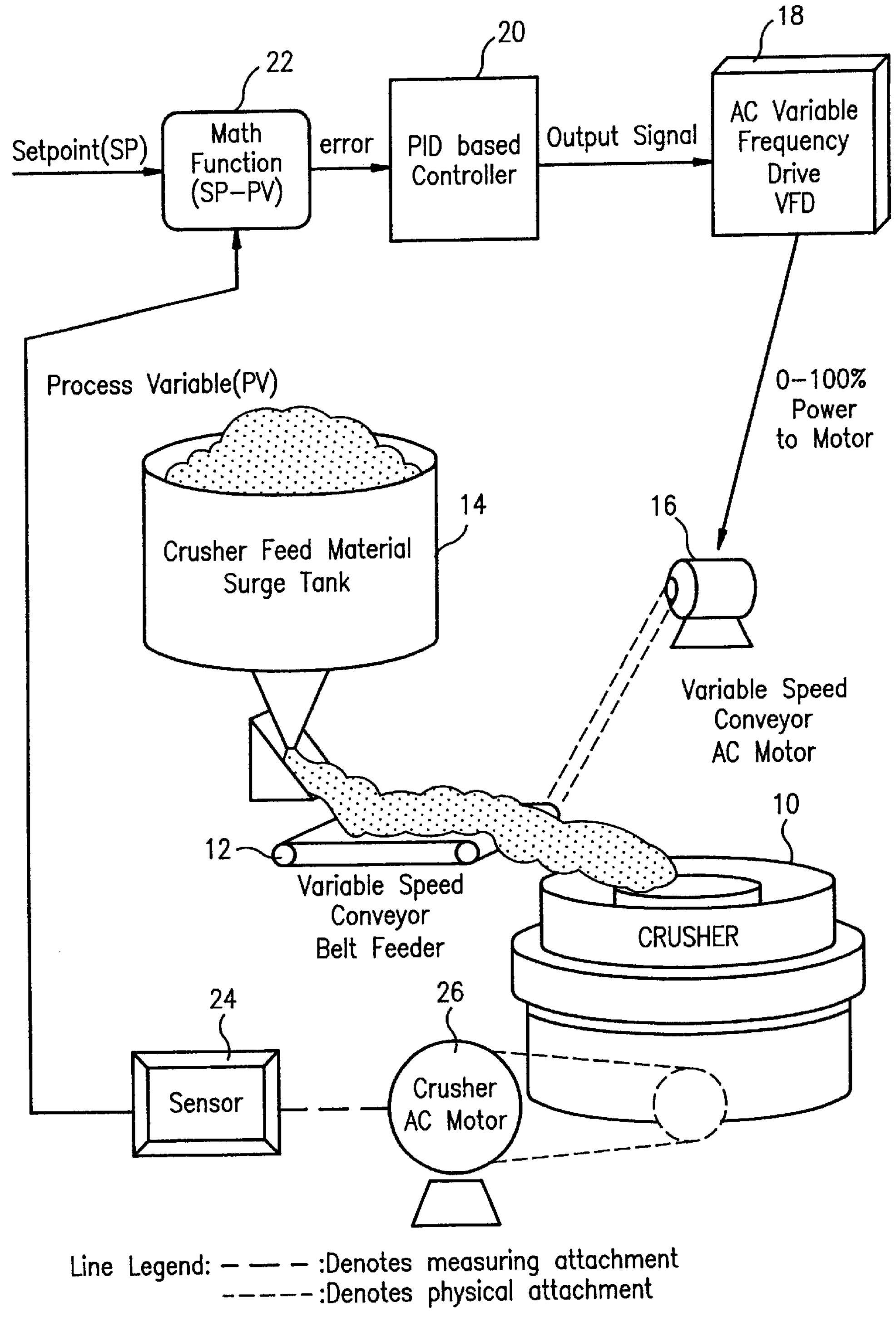
FIG. 2 PRIOR ART
FIG. 2 is a schematic diagram of a rock crusher. replenishment system using a PID-based controller.

A simple block diagram of a typical aggregate crusher feed system via a PID controller is shown in FIG. 2. An aggregate crusher 10 is fed from a variable speed conveyor belt feeder 12 with material that comes from the crusher feed material surge tank 14. In a real life situation there would also be a replenishing system into the surge tank, but is not shown for sake of clarity. The conveyor belt 12 is driven by a variable speed electric motor 16 operated by a typical AC variable frequency drive unit 18 which receives its speed signal from the output of a PID based controller 20. The PID controller 20 reacts to an error signal developed by a math function unit 22, which receives a setpoint (the desired controller target), and process variable signal from off a single sensor 24 attached to the crusher AC motor 26. The sensor 24 is a horsepower transducer, which converts the power consumed by the motor 26 into a value and translates the value into a 4–20 mA signal which is fed into the math unit 22. The AC variable frequency drive 18 is driven by the PID output signal which in turn regulates the speed of the conveyor belt feeder via the conveyor AC motor from 0–100% rpm. The crusher feed material surge tank 14 provides surge head room for the difference between the incoming feed rate and the outgoing feed demands dictated by the crusher and the feed controller. The crusher 10 is the heart of any aggregate processing plant where primary feed material is reduced to a pre-determined gradation. The crusher AC motor 26 provides the crusher mechanical components with enough horsepower to cause reduction of the feed material within its cavity.

Figure 3:
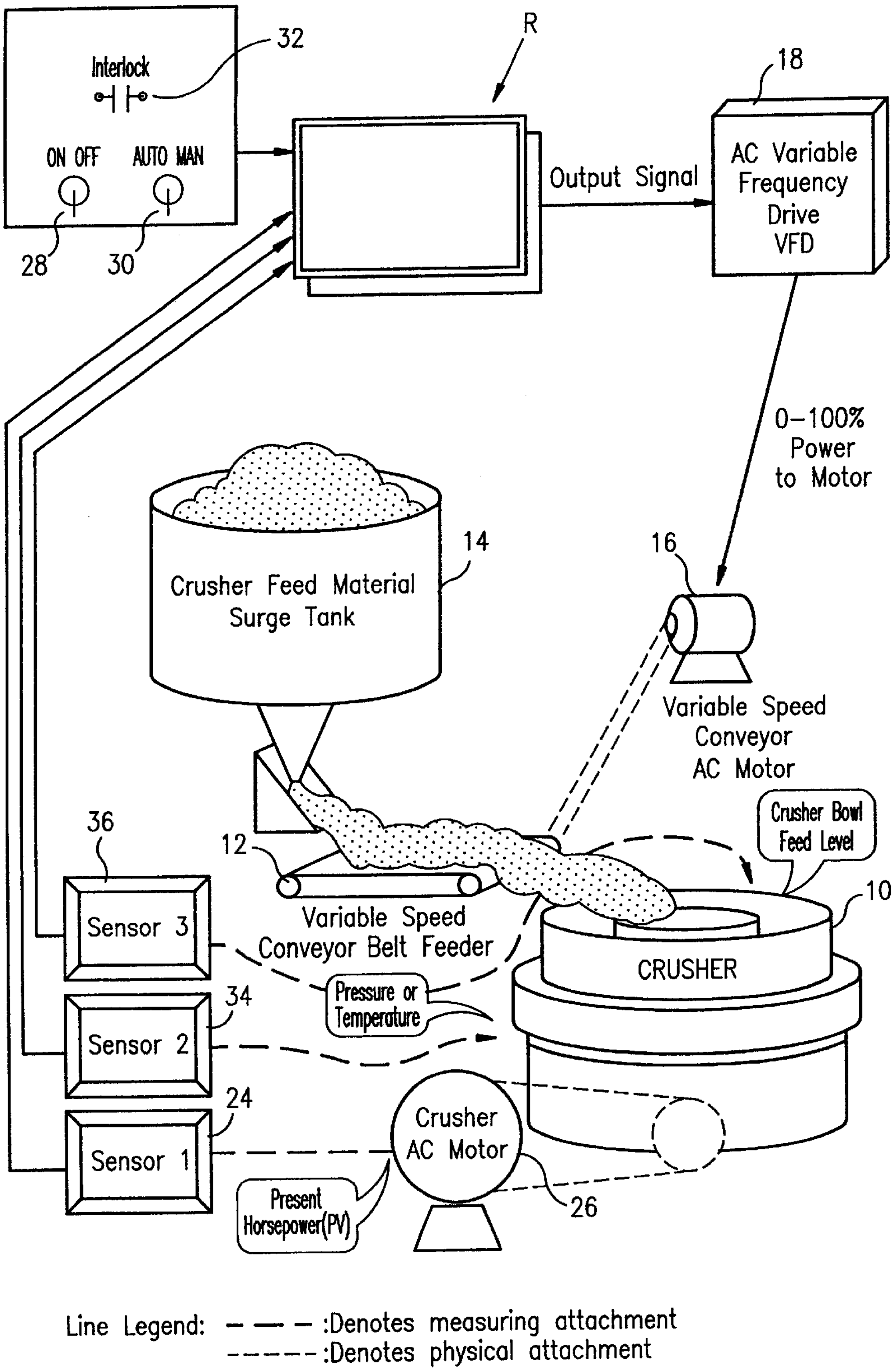
FIG. 3 is a schematic diagram of a rock crusher. replenishment system using a controller made in accordance with the present invention.

Referring to FIG. 3, an aggregate crushing system using a controller R of the present invention is disclosed. The system is the same as that shown in FIG. 2, except that the PID based controller 20 and the math function unit 22 have been replaced with the controller R of the present invention. Up to four horsepower transducers, one per motor, may be used to provide output from each electric motor of the various mechanical portions of the processing system to the controller R. However, it should be understood that any number of motor transducers may be used, limited only by the number of inputs available in the controller. A 4–20 mA signal from each of the horsepower transducer, representing the respective present motor horsepower, is transmitted to the controller R. For simplicity throughout this discussion, a processing system with only one monitored motor 26, which is monitored by sensor 24, will be used to apply the present invention. Sensors 34 and 36 are also used to monitor the temperature and material level within the crusher.

The controller R is a programmable logic controller, such as that available from Automation Direct, Cummings, Ga., Model DL205. The controller is programmed with the main system program (MSP), as will be described below, via a handheld loader, a computer through a RS 232 link, hardwired, etc.

The controller R provides an output signal, which is increased or decreased to increase or decrease, respectively, the rpm of the feeder motor 16.

Three external switches—an ON/OFF switch 28, an AUTO/MAN switch 30, and a motor starter interlock 32, commonly found on process control systems—also provide inputs to the controller R as will be discussed below. The ON/OFF switch 28 switches the process controller R and the AC variable speed conveyor belt feeder 12 into the operational mode. The AUTO/MAN 30 switch selects which mode the AC variable speed conveyor belt will run in. If AUTO, then the process controller R will regulate the speed of the conveyor belt by varying the speed of the motor 16. And if MAN, then the LOCAL controls provided on the AC variable speed drive 18 must be used to increase or decrease the speed of the motor 16. The motor starter interlock 32 provides a signal from off the monitored motor starter auxiliary contact to inform the controller R that the motor starter is ON and the motor should be running. Each monitored motor must have the respective interlock into the controller R.

The present invention has two sensor categories, namely, primary and secondary sensors.

A primary sensor 24 in the present invention is one providing data for the main control elements while in the NORMAL control mode. There can be any number of primary sensors. The primary sensor in this application of the present invention will be used to provide work or horsepower information. Though a typical crusher AC motor current transducer may be applied, the present invention will utilize horsepower or power transducers to provide motor load information mainly because power is a linear function, versus the non-linear motor current, a common known fact in electrical systems. A typical power sensor is available from Load Controls Inc., Technology Park, 10 Picker Road, Sturbridge, Mass., 01566, Model PH-3A.

Secondary sensors 34 and 36 provide additional information into the present invention to help monitor other physical quantities of the system that would impede the stable and continued operation of the process, should it shift out of normal. Information from the secondary sensors is used to further regulate the output signal provided by the controller R in place of the primary sensors when conditions that the secondary sensors are monitoring cannot be detected by the primary sensors, become critical or reach an alarm state. Such sensors can be temperature, or pressure, or level, etc. The additional information they provide will permit a sustained maximum utilization of the system's total capabilities throughout the process run time in an efficient manner as possible without overburdening any part of the system.

A secondary sensor accomplishes the above duties by providing data to specifically detect when an out-of-control condition has occurred, forcing primary control elements to relinquish operation to secondary control mode, and remains in secondary control mode until the alarm condition is alleviated through reducing the output signal, thereby decreasing work performed by the motors. Control returns back to the primary sensor when the alarm condition returns to normal and all secondary sensors are normal.

There can be theoretically any number of secondary sensors. However, for practical considerations, the present invention will be described using the two secondary sensors 34 and 36. The temperature sensor 34, which can also be pressure, material flow rate in TPH (tons per hour from a conveyor belt scale), or another motor load power sensor, monitors the temperature of the hydraulic system in the crusher 10. The level sensor 36 provides level information for monitoring level activity inside the crusher feed bowl, or transfer point, or feed box, feed hoppers, of a replenishment system. Typical level sensors in the market today that will work with the present invention include microwave devices, ultrasonics, tilt switches, plumb bobs, etc.

Secondary sensors are used to monitor critical areas in the process mechanics that become stressed when overburdened (which will be referred hereinafter simply as sensor regardless of the actual type used). The controller R looks at a 4–20 mA signal which is a standard output for most types of sensors).

The motor sensor must be able to provide 4–20 mA output over the range of the motor horsepower. The level sensor, temperature sensor, and the pressure sensor may be the 4–20 mA type, where 4–20 mA represents the level range or the temperature or pressure range of the device. It may also be of the single point level, single point temperature, or single pressure type, where the output of the device is a contact closure. Either type sensor can be used.

Figure 4A:
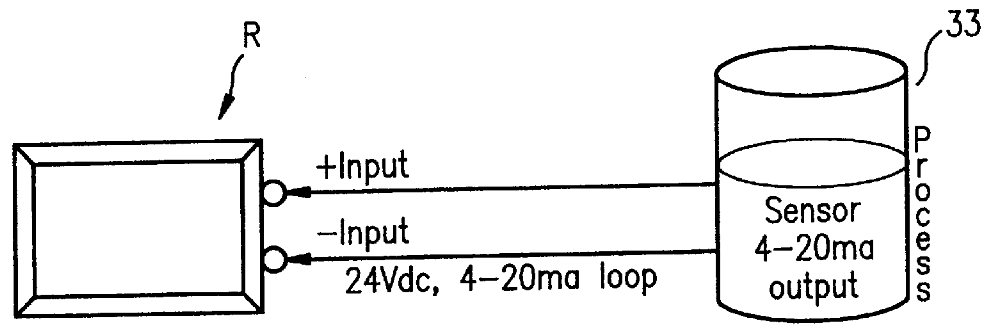
FIGS. 4A and 4B are schematic diagrams of sensors for used with the present invention.

Referring to FIG. 4A, a sensor 33 with 4–20 mA output can have a temperature range of 0°–3000° F., where 4 mA=0° F. and 20 mA=3000° F. A critical temperature target of 1500 ° F. may be selected, which is provided by 12 mA output.

Figure 4B:
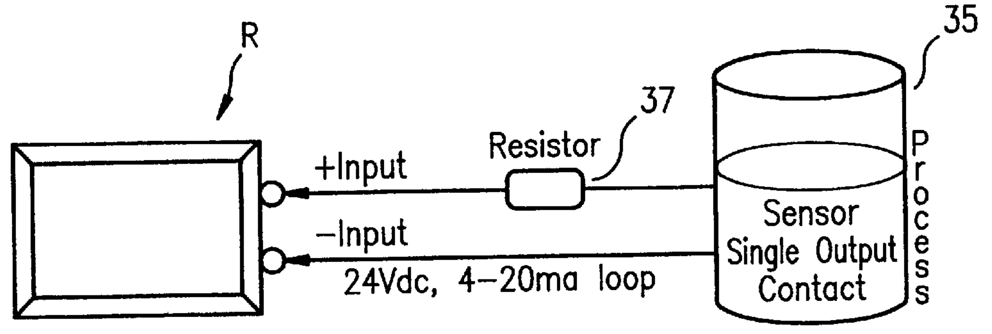

For a single point contact closure sensor 35 shown in FIG. 4B, one skilled in the art will understand that the single contact closure sensor can be used in a 4–20 ma loop by inserting a resistor 37 of the correct value into the 4–20 ma input loop. The proper size resistor will limit the current to the desired sensor target value. This will enable the 4–20 mA output sensors to work as well with single point contact closure type sensors without having to redesign the inputs into the controller R. For example, for a sensor range 0°–3000° F., sensor closure at 1500° F., the value of the resistor 37 is 24 VDC/12 mA=2000 ohms. In another example with sensor range 0–2000° F. and target value of 1500° F., the resistor value is calculated as follows, Δ° F./ΔmA=2000/16=125° F./mA Sensor closure at 1500° F.,
or [(Units/125° F.)+4)]=1500/125+4=16 mA,
Resistor value=24 Vdc/16 =1500 ohms.

Figure 5A:
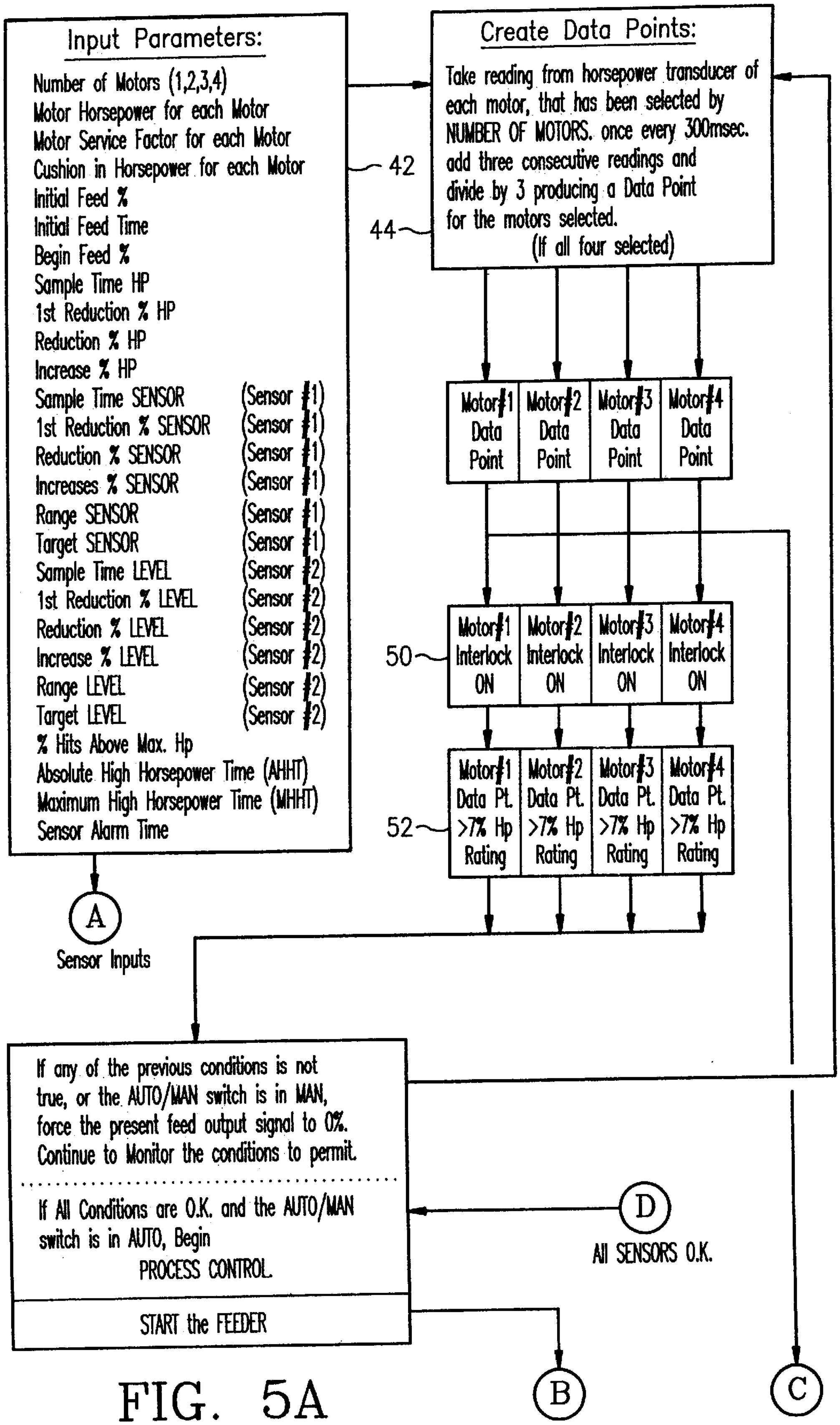
FIGS. 5A–5G are logic flow diagrams of the program made in accordance with the present invention.
Figure 5B:
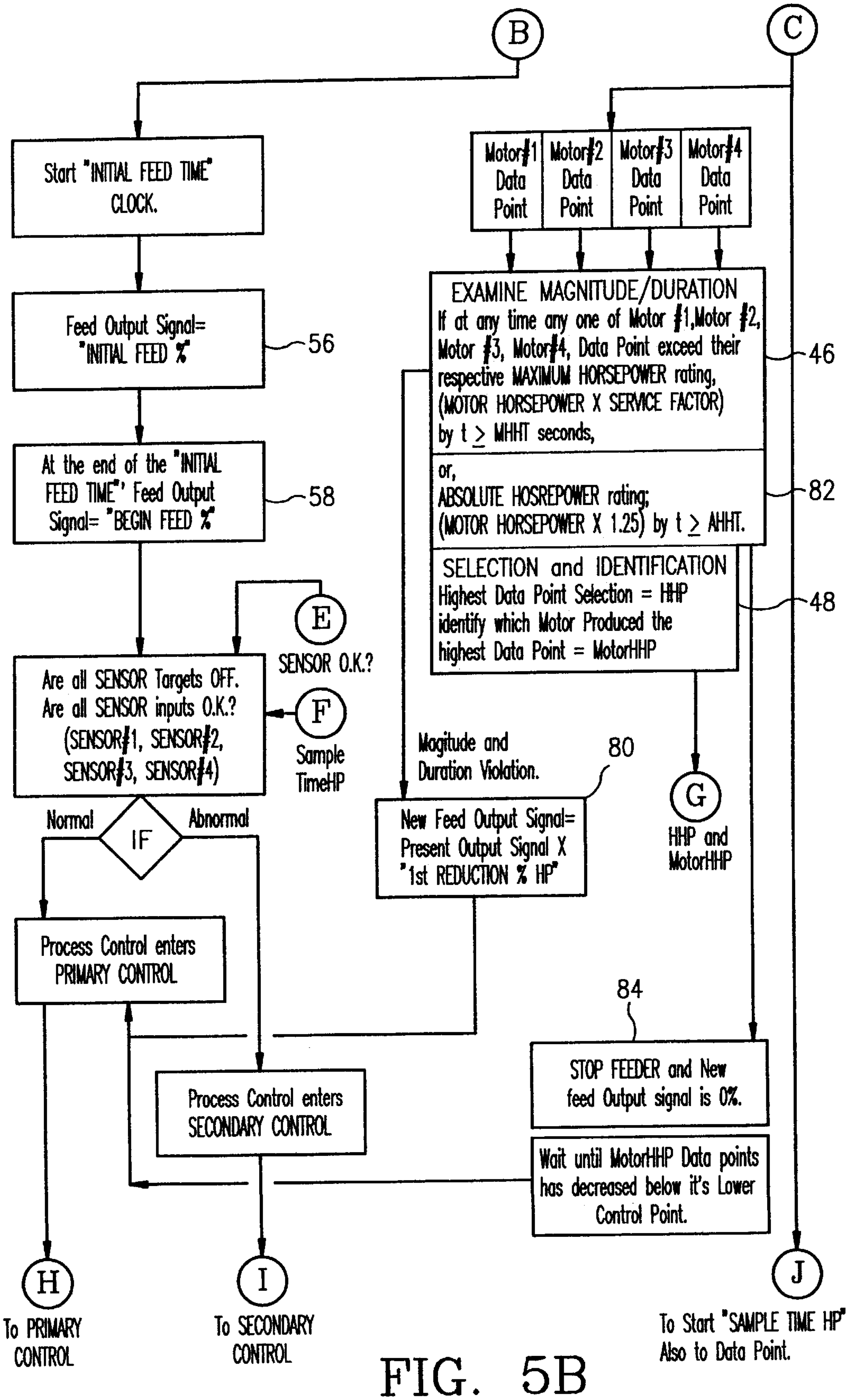
Figure 5C:
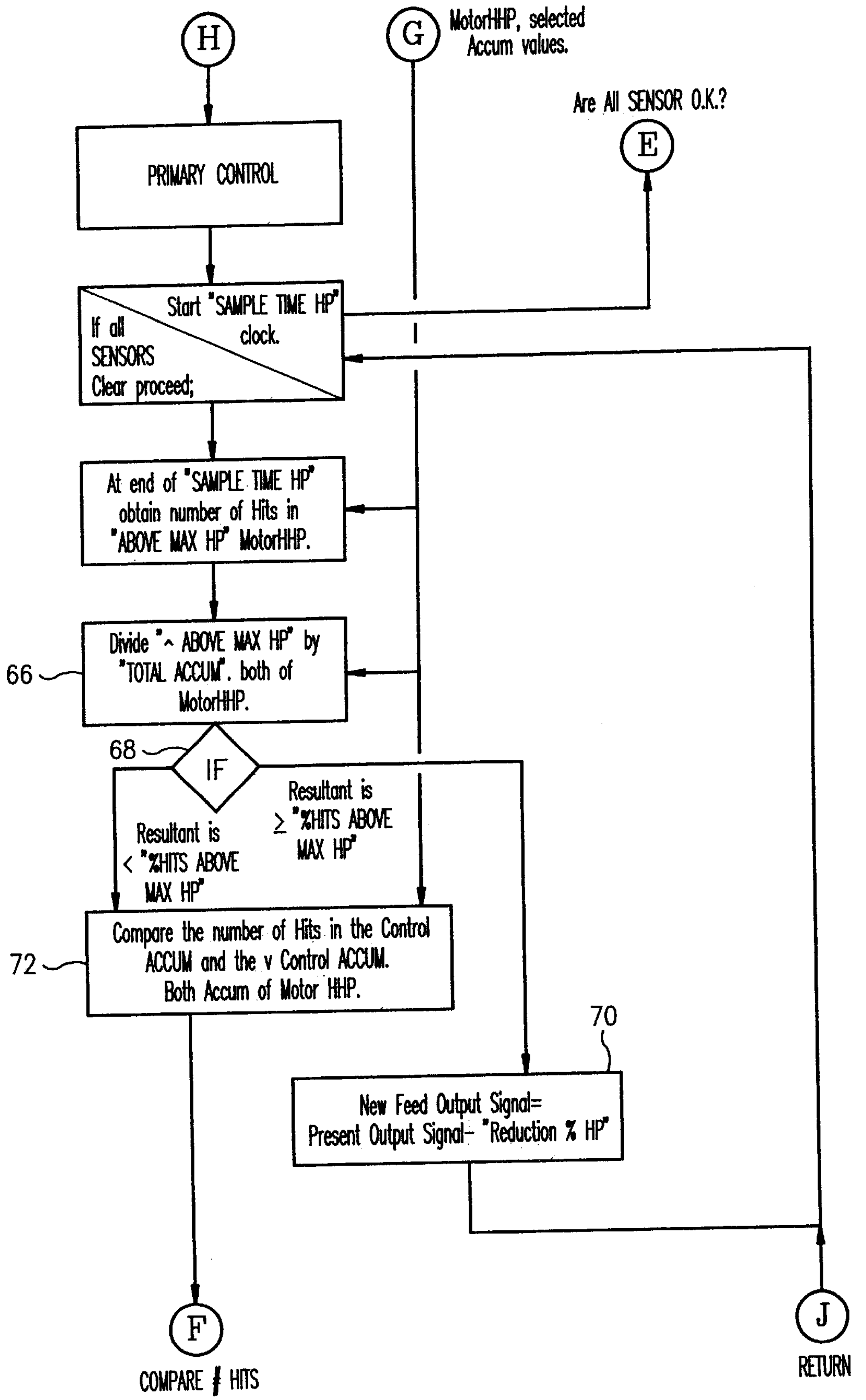
Figure 5D:
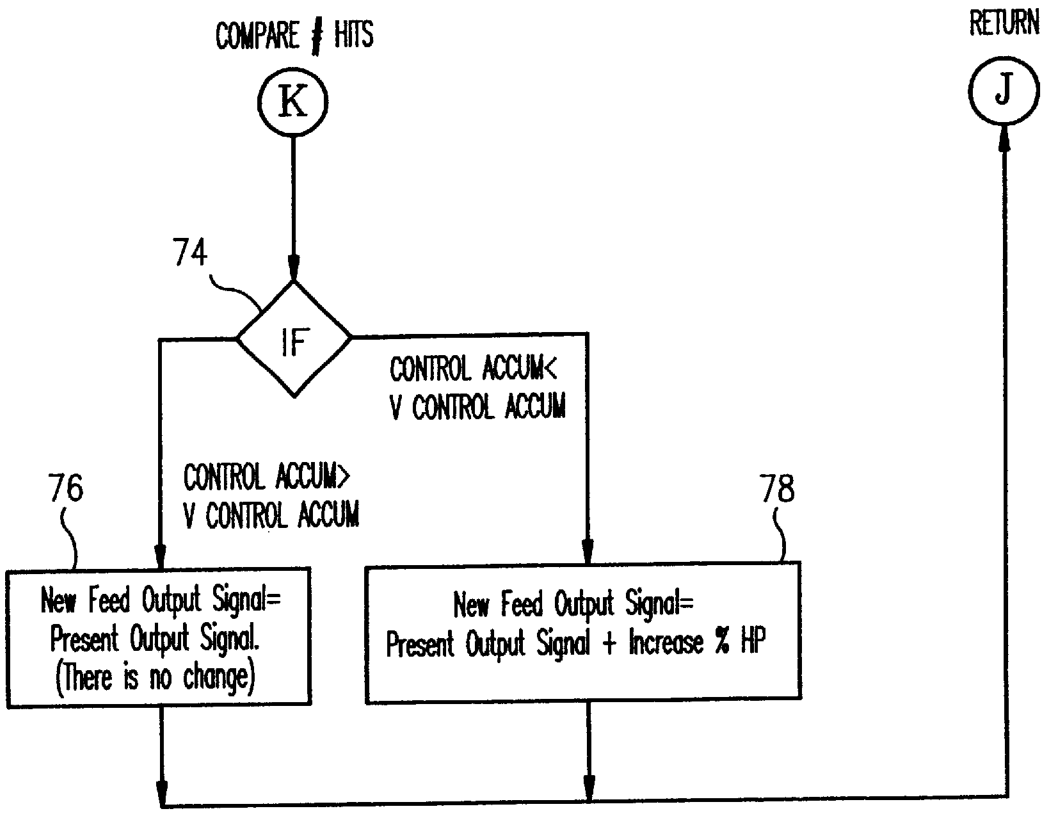
Figure 5E:
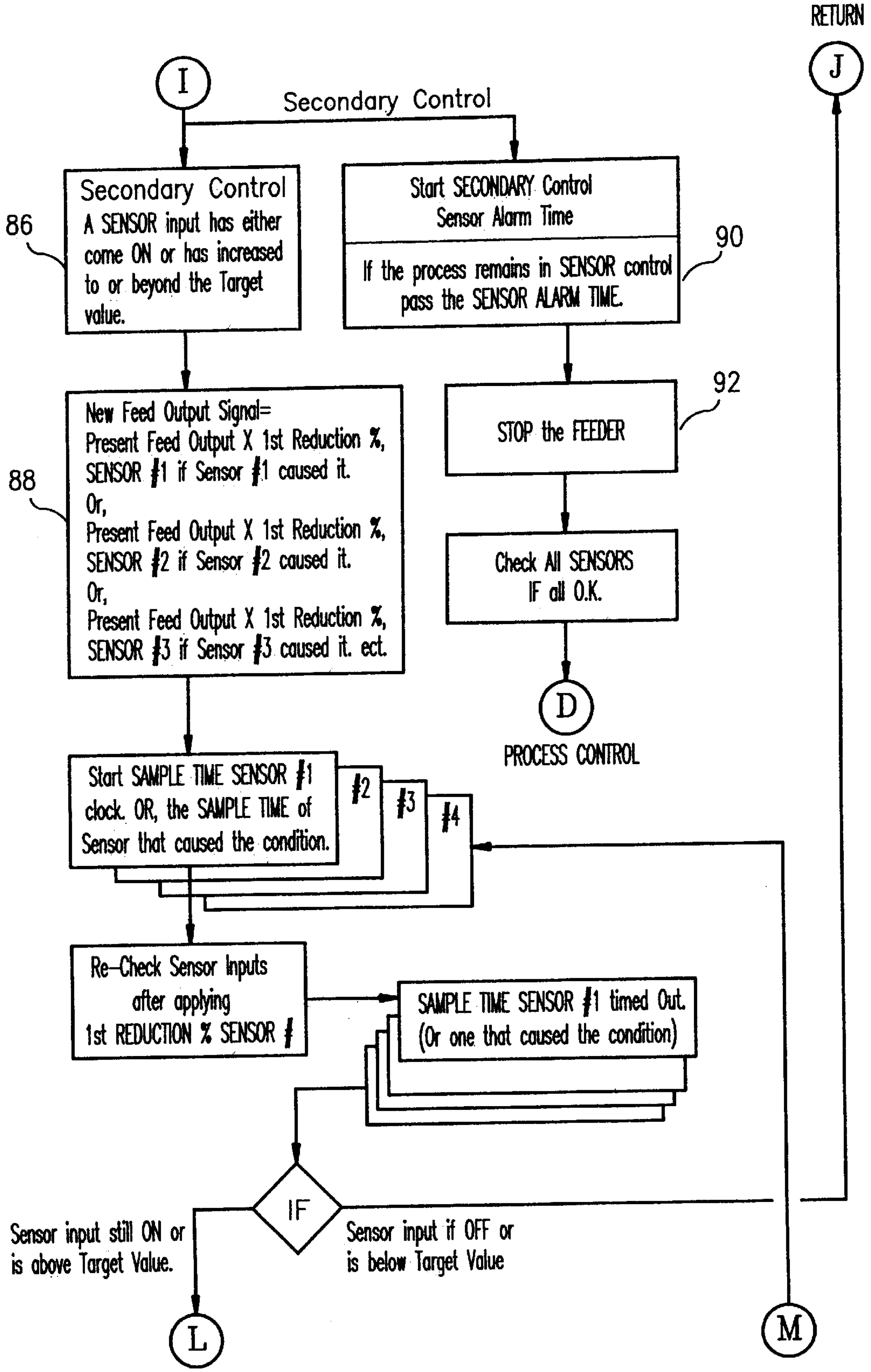
Figure 5F:
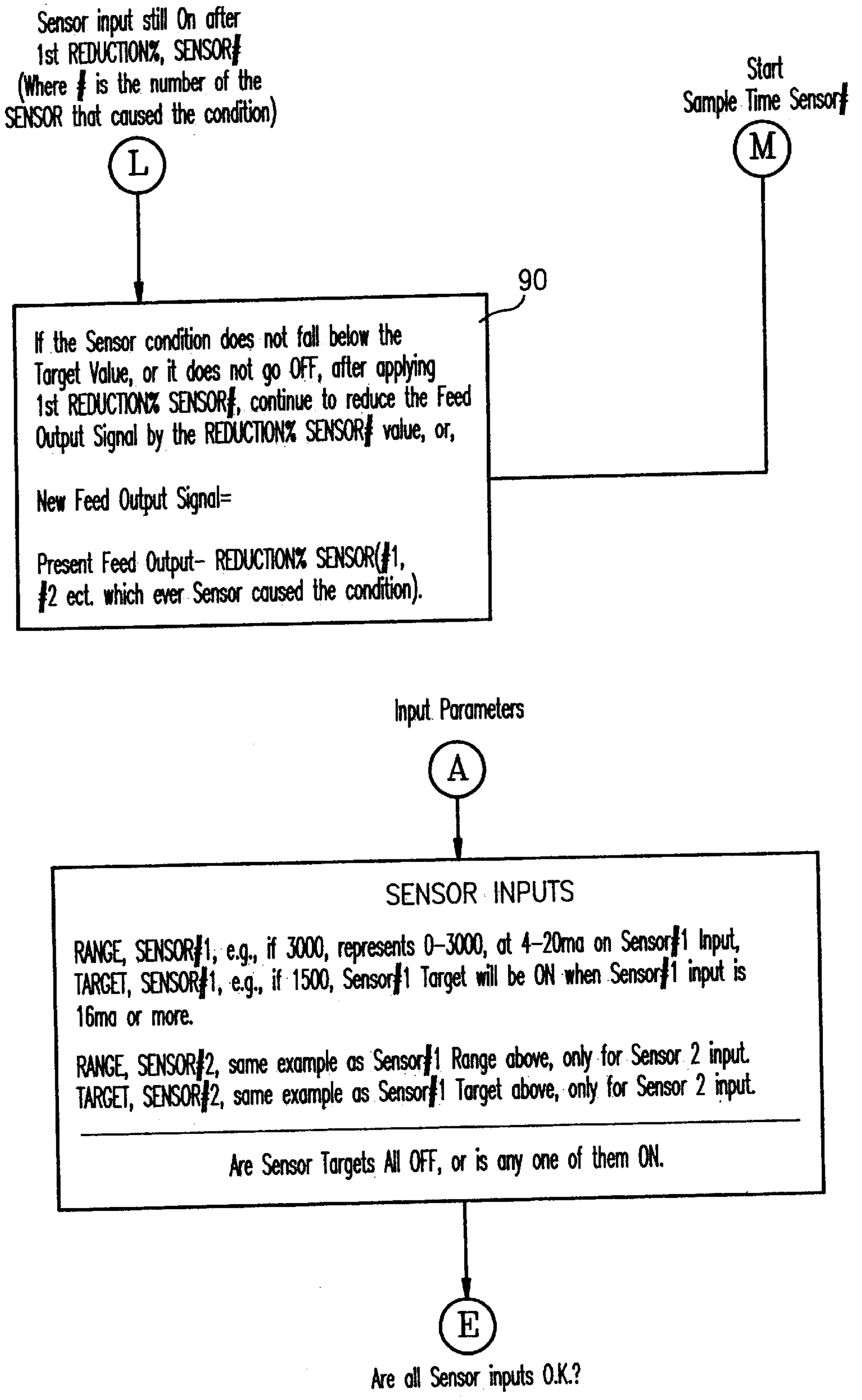
Figure 5G:
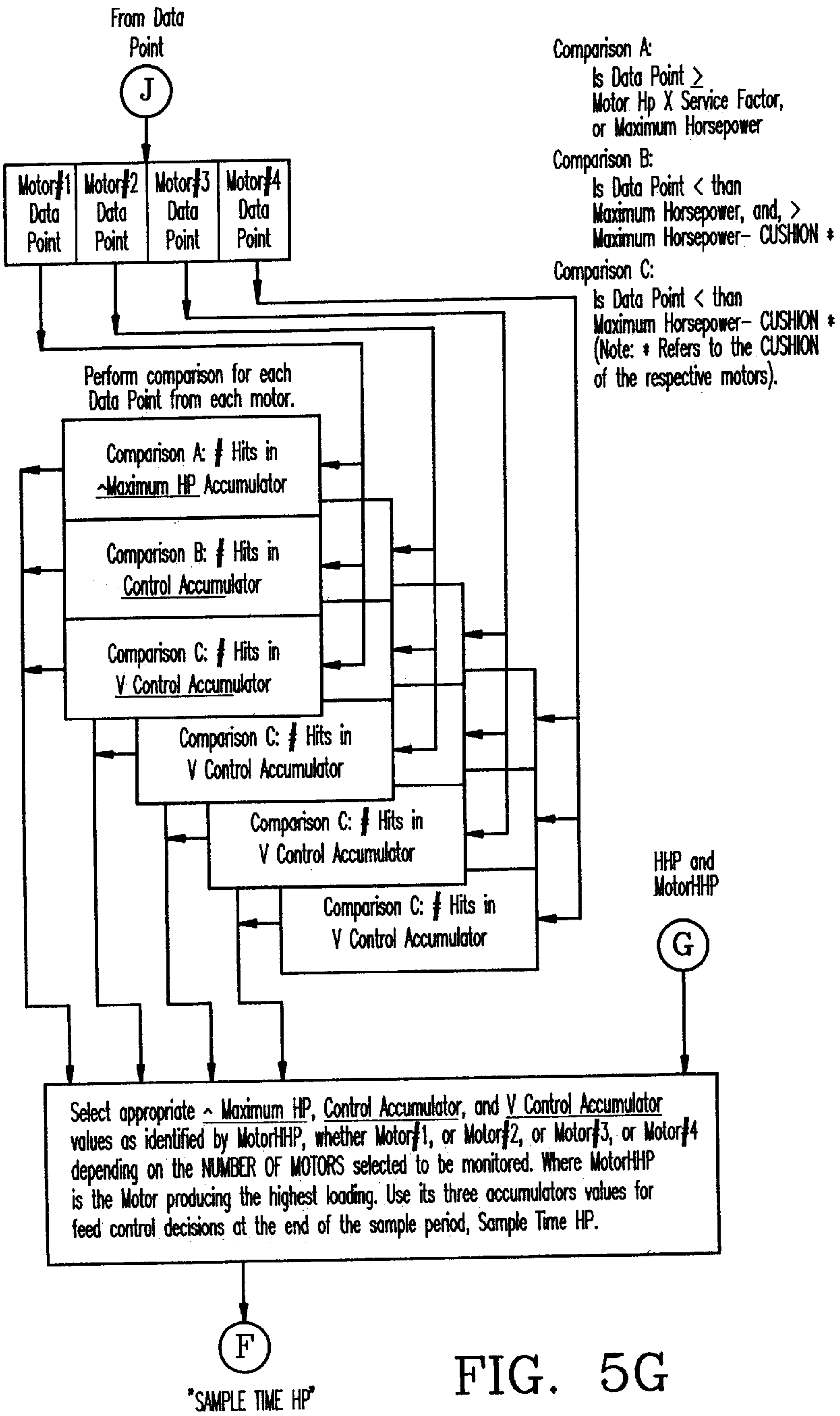

The controller R is programmed with a main system program MSP to control the aggregate crusher replenishment process. The following parameters, which are entered at 42 as shown in FIG. 5A, are used to configure the MSP algorithms:

A. Number of Motors—1, 2, 3, 4. A selection is made as to the number of motors used in the application, e.g, 1, 2, 3, or 4. If only two inputs are used in the controller, the remaining inputs are ignored. Each motor has its own input and each input feeds its own data point generator, previously explained. A practical number of motors within a feed replenishing system is 4. A crusher can have up to two motors, with conveyors and screens. In general the feed replenishment system is a serial process, meaning raw feed is processed from beginning to end, going from one component to the next component in a series arrangement. Therefore, any electrically driven component when overloaded will constrain the controller R to decrease feed regardless of how un-loaded the remaining components on the processing system are at the moment, due to the series arrangement. Though the number of motor inputs is practically limited, there are no theoretical limits to the present invention.

B. Motor Horsepower—Nameplate rating of the motor in XXX Horsepower (standard on motors.) For multiple motor applications, each motor horsepower rating. Each motor has a separate input to the controller R, namely, Motor#1 Hp, Motor#2 Hp, Motor#3 Hp, and Motor#4 Hp.

C. Motor Service Factor—Nameplate service factor of the motor, typically 1.00–1.15 (standard on motors). Service factor is the amount of intermittent loading beyond the nameplate rating that a motor can safely maintain. For example S.F. 1.00 means 0% overload, S.F. 1.15 means 15% overload, etc. For multiple motor applications, each motor Service Factor (S.F.) has separate inputs to the controller R, namely, Motor#1 S.F., Motor#2 S.F., Motor#3 S.F. and Motor#4 S.F.

D. Initial Feed %—Amount in XX % of signal output from the controller R when it comes ON initially at the beginning of AUTO control.

E. Initial Feed Time—Time in XXX seconds to force Initial Feed % setting on the output signal when the controller initially comes ON.

F. Begin Feed % —Amount of signal output controller will feed the crusher, coming out of the Initial Feed Time in seconds. It is called the Begin Feed % because this setting is used by the MSP as the first output signal level at the beginning of process control.

G. 1st Reduction % Hp—The first reduction in XX % of the present feed output signal after the controller detects a High Horsepower Alarm. If set to 80% the first reduction will be 80% of the present output signal level. For example, if the present output signal level is 80%, then it will be reduced to (80%) of (80%)=64 %. The purpose of the first reduction is an attempt to return the motor loading back down to within the control margin upon the first correction.

H. 1st Reduction % Sensor—The first reduction in XX % of the present feed output signal after the controller detects a sensor input value equal to or exceeding the Sensor Target value. Note that in multiple sensor application each sensor will have its own 1st Reduction %, Reduction %, and Increase % parameters.

I. 1st Reduction % Level—The first reduction in XX % of the present feed output signal after the controller detects a Level input signal from the crusher bowl, feed box or transfer point. Note that Level is just another sensor but will be treated as Level to minimize confusion of similar terms.

J. Reduction % Hp—The controller will reduce the present signal by XX % when it produces a decision to reduce the output signal level while in Horsepower Control. For example, if the present output signal level is 89%, then a 2% reduction will decrease the present output signal to 87% at the conclusion of the Sample Time (discussed below).

K. Increase % Hp—The controller will increase the present signal by XX % when it produces a decision to increase the output signal level while in Horsepower Control. For example, if the present output signal level is 63%, then a 1% increase will raise the present output signal to 64% at the conclusion of the Sample Time.

L. Reduction % Sensor—The controller will reduce the present output signal by XX % when it produces a decision to reduce the output signal level while in Sensor Control. For example, if the present output signal level is 89%, then a 2% reduction will decrease the present output signal to 87% at the conclusion of the Sample Time.

M. Reduction % Level—The controller will reduce the present signal by XX % when it produces a decision to reduce the output signal while in Level Control. For example, if the present output signal level is 89%, then a 2% reduction will decrease the present output signal to 87% at the conclusion of the Sample Time.

N. Cushion in Horsepower—The degree of "cushion" in horsepower which when subtracted from the maximum allowable horsepower (motor horsepower×service factor or upper control point) will establish the lower control point, as will become clear below.

Motor Horsepower×Service Factor−Cushion=Lower Control Point.

The cushion is preferably equal to the motor horsepower rating times its service factor minus the motor horsepower rating. For multiple motor applications, each motor will have its own cushion input to the controller R, namely, Cushion Motor#1, Cushion Motor#2, Cushion Motor#3 and Cushion Motor#4.

O. % Hits Above Max Hp—The number of hits or occurrences above the Maximum Horsepower point within the Sample Time divided by the total number of hits during the Sample Time. Maximum horsepower point is defined as the Motor Horsepower×Service Factor, or, Maximum Horsepower=Motor Horsepower×Service Factor.

A hit is a selected data point that falls within one of three feed control decision making zones (see FIG. 6), as will explained below. A Data Point is created by reading the motor horsepower off the horsepower transducer 24 attached to the AC motor 26 (see FIG. 3) within the feed replenishing system, once every 300 msec, taking three readings, and then dividing the accumulated total by 3.

$$\text{Data Point} = \frac{\sum \text{Three consecutive readings @ .3 sec}}{3}$$

Since there can be as much as four motors, there are four data point generating circuits, one per motor.

A Total Hit Counter adds the total number of Data Points created within the Sample Time. There are four Total Hit Counters, one per motor. An Above the Maximum Horsepower Hit counter, also four, adds the total number of hits above the Maximum Horsepower point for the respective motors. The Total Hits Above the Maximum Horsepower is divided by the total number of Hits created within the Sample Time to produce the % Hits Above the Maximum Horsepower value, one for each motor. The controller compares this present value to the parameter inserted into the program by the user, i.e., the % Hits Max. Hp parameter, and determines what course of action to take. If any of the %O Hits Above the Maximum Horsepower value from any of the four motors, or the motors that are being used, whether 1, 2, 3 or 4, are equal to or have exceeded the % Hits Max. Hp parameter selected by the user, the controller output signal is reduced.

The % Hits Max. Hp parameter for a rock crusher application has been found to be about 3%–5%. A person skilled in the art will understand that this parameter may vary, depending on the particular system the invention is being applied to.

P. Sample Time HP—The time in XXX seconds in which the controller allows data point grouping for analysis and reaction, while in Horsepower Control, usually 3–10 seconds for quick response systems, or 10–20 seconds for slow response systems.

Q. Sample Time Sensor—The time in XXX seconds during which control is shifted to Sensor Control when the Sensor Target value has been equaled or exceeded. Sensor control will remain for the entire Sample Time Sensor. Sensor control simply uses 1st Reduction % Sensor, Reduction Sensor %, and Increase Sensor % values until such a time that the sensor input no longer remains equal to or beyond the Sensor Target value during any portion of the Sample Time Sensor. Control returns to Horsepower Control when the sensor input is less than the Sensor Target value with Reduction % HP, Increase % HP, and Sample Time HP taking over control.

R. Sample Time Level—The time in XXX seconds during which control is shifted to Level Control when the Level input is ON. Level control will remain on for the entire Sample Time Level. Level control uses 1st Reduction % LEVEL, Reduction LEVEL %, and Increase LEVEL % values until such a time when the Level input is no longer ON. Control returns to Horsepower Control when the Level input is OFF and Reduction % HP, Increase % HP, and Sample Time HP takes over.

S. Sensor#1 Range—The Sensor Range in XXX units which the 4–20 mA output coming from the sensor processor represents. For example, 20 mA output may represent 3000 units (F,C,PSI,etc.) with 4 mA representing 0 units. Sensor #2 Range, Sensor #3 Range, etc. will be exactly the same.

U. Sensor #1 Target—The maximum allowable sensor output unit beyond which the feed steering algorithms will begin reducing feed. For example, 1500 units means that the feed steering algorithms will begin reducing feed into the system at or above 1500 units, or from 12 mA and greater. Sensor #2 Target, Sensor #3 Target, etc. will be the same.

V. Absolute High Horsepower Time—Referred to as AHHT, is the time in seconds beyond which feeder output will be forced to 0 % and the feeder Start/Stop is forced to Stop. Absolute High Horsepower (four if four motors are used) is defined in the present invention as Horsepower Rating (of each motor)×1.25, and serves as the secondary safety device. If the immediate horsepower from any of the motors being monitored equals or exceeds its respective Absolute High Horsepower rating for the time in Absolute High Horsepower Time, the feeder is forced to Stop and the new feed output signal is forced to 0%.

W. Maximum High Horsepower Time—Referred to as MHHT is the time in seconds beyond which feeder output will be forced into reduction by multiplying the present output by 1st Reduction % HP. Maximum High Horsepower (four if four motors are used) is defined in the present invention as Horsepower Rating (of each motor)×Service Factor (of each motor) and serves as the primary safety device. If the immediate horsepower from any of the motors being monitored equals or exceeds its respective Maximum Horsepower rating for the time in Maximum High Horsepower Time, the new feeder output signal will be reduced by multiplying the present feeder output signal by the 1st Reduction % HP parameter. If the process continues to remain beyond the Maximum High Horsepower rating but below the Absolute High Horsepower rating of that particular motor that is causing the high reading, the new feeder output signal is the present feeder output signal minus the Reduction % HP parameter, at the end of the Sample Time HP, and continues to reduce the present feed output signal by the Reduction % HP rate at the end of the Sample Time HP so long as the process remains equal to or beyond the Maximum High Horsepower but below the Absolute High Horsepower values.

X. Sensor Alarm Time—The time in seconds allowing the Secondary Control circuits to return the out of range sensor value to below the target setting, after which the feeder is STOPPED. The feeder is allowed to START once all sensors have returned below Target settings, and control enters the beginning of PROCESS CONTROL.

Referring to FIGS. 5A–5G, the above parameters are entered at 42. The controller R then creates Data Points at 44 from the information it receives from the motor horsepower transducer 24.

Each of the several Data Points being created by the respective motors in the feed replenishment system are first examined individually at and then compared against each other. First, each Data Point is examined at 46 for magnitude and length of time or duration for alarm indicators conditions. Secondly, the magnitudes of all the Data Points created from the four motors (if four) within the 300 msec time are compared against each other.

Since the feed replenishment system is a serial process the motor producing the greatest work, in horsepower, compared to its own ratings (not greatest horsepower overall because the motors may be of different sizes) is adopted or selected at 48 for the moment as the primary control Data Point value for the entire system, while the rest is ignored until the next sample period 300 msec later. This selected Data Point will be referred to from this point on as HHP.

The HHP coming out of the highest Data Point selection algorithm at 48 is used to determine what to do with the present feed output signal, whether to increase or decrease it, or shut the feed system OFF.

An aggregate crusher system is running without feed at this point. The Feeder On/Off switch 28 is placed in the ON position, and the AUTO/MAN switch 30 is placed in the AUTO position, permitting the MSP to function.

The MSP monitors horsepower from up to four motors and determines that the interlock from the motor starter is On at 50, or closed, and the individual component motors are in fact running. This condition must be satisfied before feed can be introduced into the system.

The MSP compares at 52 each Data Point of each motor to 7% of each of the respective motor horsepower rating (7% is alterable if the actual is lower). If each Data Point is above 7% of the motor horsepower rating and the individual motor contactor is On, the motor is in fact energized. The MSP will start to introduce feed into the system. For the crusher system using one sensor for the crusher motor, the MSP needs only to inspect one Data Point from the crusher motor. If it passes the test, then feed is introduced into the system or crushing cavity at 54. If it does not, feed is not introduced into the system.

The MSP will introduce initial feed at a rate predetermined by the Initial Feed % parameter at 56 and is sustained at that value for the time set in Initial Feed Time. This feature advantageously eliminates start-up oscillations associated with PIDs by maintaining the exact amount of initial or prime feed to get the process going.

The MSP then outputs at 58 the signal level entered in Begin Feed % at the close of Initial Feed Time.

Initial Feed %, Initial Feed Time and Begin Feed are designed to gently bring the process into stability prior to enabling the actual feed correction algorithms to take over. The combination of these parameters provide versatility in configuring the feed system for different initial feed patterns. It can be used to introduce"choke feed," or initially subjecting the system to a heavy feed rate forming a head which will decelerate the transit time of the material through the system. Once the head of material has been established choke feed must be disabled so that the system does not overload. Disabling choke feed is easily accomplished with the Initial Feed Time value. The three parameters can also be used to "prime feed," or introduce feed at a given rate for a length of time, so that at the end of that time period the entire system is primed, or has material going through it, prior to enabling the feed regulating algorithms.

Choke feed can be accomplished by increasing Initial Feed % to the desired choke feed level within the desired Initial Feed Time. On the other hand prime feed can be accomplished by maintaining the desired Initial Feed % for the longest time possible until the processing system is primed with material by entering the desired time in Initial Feed Time.

The preceding algorithms advantageously minimize swings and system oscillation on start-ups such as experienced with PID- based control.

From this point on the MSP enters the monitoring and decision making algorithms. The present invention thus far has been devoid of high level mathematics.

The MSP contains four counters which will be referred to as Hit Accumulators. There are four redundant groups of the Hit Accumulators, one for each motor. Each of these accumulators count the number of hits or number of times a Data Point has satisfied the requirements of that particular accumulator, within the Sample Time HP, from the respective motors.

Figure 6:
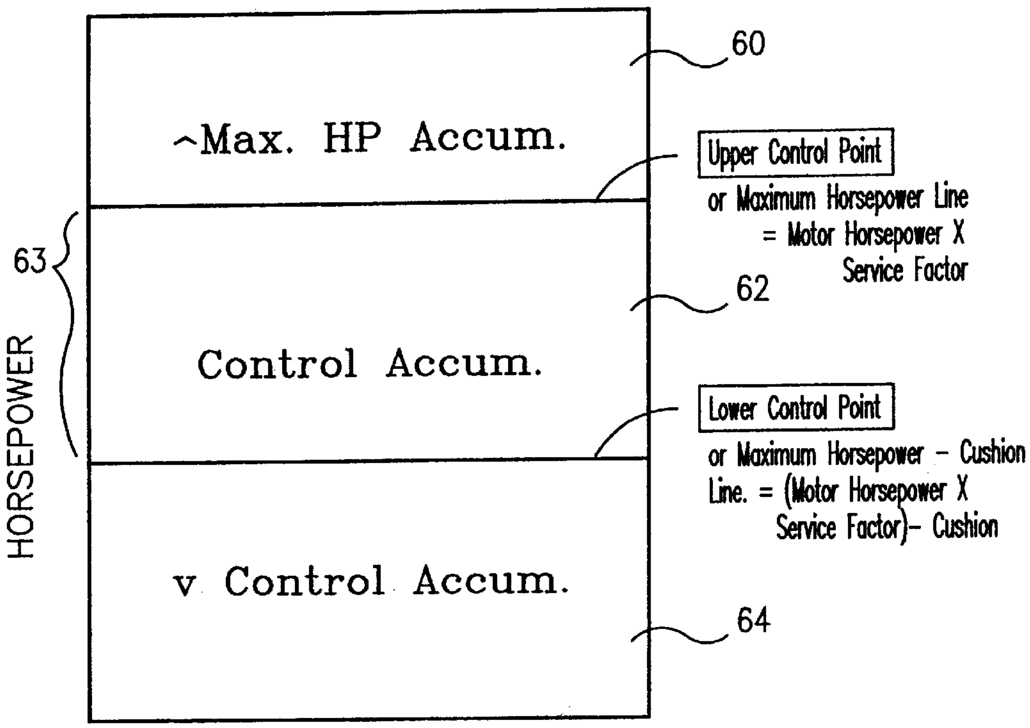
FIG. 6 is a graphical representation of counters used in the present invention.

Referring to FIG. 6, the first of the Hit Accumulators is called the Above Maximum Horsepower Hit Accumulator, which will be referred to as ^Max. Hp Accum. 60. The second is called the Control Hit Accumulator, which will be referred to as Control Accum. 62. The third is called the Below Control Hit Accumulator, which will be referred to as the Control Accum. 64 The fourth is called the Total Hit Accumulator (not shown), which will be referred to as the Total Accum.

The ^Max. Hp Accum. 60 counts all the hits recorded within the Sample Time that are equal to or above the Maximum Horsepower of that particular motor.

The Control Accum. 62 counts all the hits or HHPs, recorded inside the control space or margin 63, defined as the area above Maximum Horsepower−Cushion line and below the Maximum Horsepower value within the Sample Time (Maximum Horsepower and Cushion values are per motor).

The Control Accum. 64 is used to count all hits recorded below the control space 63 within the Sample Time.

The Total Accum is used to count the total number of Data Points created within the Sample Time and is represented by the equation, Σ^Max.Hp Accum.+ΣControl Accum+ΣvControl Accum=Total Accum.

The information contained in the four Hit Accumulators at any time forms the core of feed correction decisions, demonstrating that the present invention functions independently of error signals commonly used in PID based control.

Figure 7:
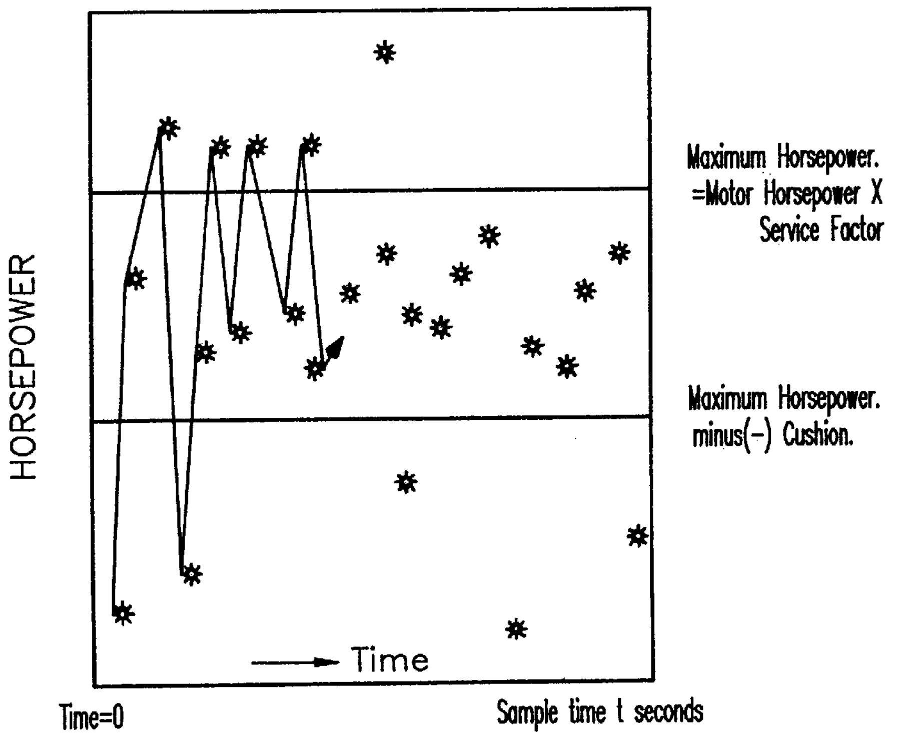
FIG. 7 is a graphical representation of hits as a function of time.

FIG. 7 shows an example of hits generated by a crusher motor and accumulated in the three accumulators during a sample time. Note ^Max Hp Accum.=5, Control Accum=15, vControl Accum.=5, and Total Hits Accum.=25. ^Max. Hp Accum./Total Hits=5/25, or 20%. If the parameter % Hits Max. Hp Accum.=20 or less, the MSP would decrease the present output signal level by the Reduction %.

Feed correction decisions are based on two conditions—the information contained in the hit counters and the magnitude of the highest Data Point from among the four possible motors (if four motors were used). The MSP utilizes a rather simple method of determining in what direction the output signal of the controller R will be corrected, whether up or down, thereby to increase or decrease the rpm of the feeder motor 16. This method is explained below.

The MSP divides the ^Max. Hp Accum. value by the Total Accum. value at 66 and compares at 68 the resultant % Hits Max. Hp Accum. value at the conclusion of the Sample Time HP for each of the four redundant ^Max. Hp Accum. and Total Accum. If and one of the resultant is equal to or larger than the % Hits Max. Hp Accum. parameter, then the MSP will reduce the output signal at 70 by subtracting the Reduction % HP parameter from the present output signal level. This process repeats itself as long as any of the ^Max. Hp Accum. divided by the Total Accum value from any of the four motors is equal to or is larger than the % Hits Max. Hp Accum. parameter at the conclusion of the Sample Time HP.

Or, logically, at the conclusion of the Sample Time HP, if:

$$\text{Motor \#1, if, } \frac{\text{^Max. Hp Accum.}}{\text{Total Accum.}} > \text{\% Hits Max. Hp Accum.,}$$

or $$\text{Motor \#2, if, } \frac{\text{^Max. Hp Accum.}}{\text{Total Accum.}} > \text{\% Hits Max. Hp Accum.,}$$

or $$\text{Motor \#3, if, } \frac{\text{^Max. Hp Accum.}}{\text{Total Accum.}} > \text{\% Hits Max. Hp Accum.}$$

or $$\text{Motor \#4, if, } \frac{\text{^Max. Hp Accum.}}{\text{Total Accum}} > \text{\% Hits Max. Hp Accum.,}$$

New Output Signal Level=Present Output Signal Level−Reduction Sensor %.

If none of the four ^Max. Hp Accum. values are equal to or larger than the % Hits Max. Hp Accum. value within the Sample Time HP, the MSP inspects at 72 the Control Accum. and vControl Accum. of the motor that is producing the highest work or HHP. For the purposes of this discussion this motor will be identified as MotorHHP.

The MSP identifies the MotorHHP and its Hit Accumulators, then determines where the majority of the hits have landed during the Sample Time and executes the next routine if the calculated % Hits Above Maximum Horsepower is less than the t Hits Max. Hp Accum. Hp. parameter.

The MSP examines MotorHHP accumulators at 74. If the number of hits recorded within the control area or Control Accum. is greater than vControl Accum. at the end of the Sample Time, the MSP at 76 will not correct the output signal level. This process repeats itself as long as the Control Accum.>vControl Accum.

Or, at the conclusion of the Sample Time HP:

If none of the four ^Max. Hp Accum. values are equal to or larger than the % Hits Max. Hp Accum. value within the Sample Time HP, MotorHHP, if Control Accum>vControl Accum, New Output Signal Level=Present Output Signal Level.

Or, if upon examining MotorHHP accumulators at 74, the MSP finds a majority of the hits fell below the control area or Control Accum. recorded in vControl Accum., the MSP at 78 will increase the output signal level by the Increase % parameter. And this process repeats itself as long as the Control Accum. is less than vControl Accum. at the conclusion of the Sample Time HP.

Or, if at the conclusion of the Sample time HP:

If none of the four ^Max. Hp Accum. values are equal to or larger than the % Hits Max. Hp Accum. value within the Sample Time HP, and if upon examining MotorHHP accumulators, the MSP finds a majority of the hits fell below the control area or Control Accum., recorded in vControl Accum., Control Accum.<vControl Accum., New Output Signal Level=Present Present Output Signal Level+Increase %.

Concurrently, if, while the MSP is performing the above routines, any of the Data Point from any of the four motors has a magnitude that exceeds Maximum Horsepower for a length of time at 46, or is sustained for a continuous period of t≧MHHT, the feed output signal will be reduced by the 1st Reduction % HP at 80.

If at any time any one of the four motors have a Data Point whose magnitude and duration exceed the following:

If, HHP≧Maximum Horsepower for t≧MHHT seconds New Output Signal Level=Present Output Signal Level×1st Reduction HP %.

The 1st Reduction % is an attempt to reduce the physical strain imposed on the system, and return the loading back to normal on the first correction, when HHP has either equaled to, or exceeded, the maximum horsepower of MotorHHP. 1st Reduction % is used only at the first occurrence of the intrusion. Subsequent feed corrections, based on the Hit Accumulators, previously explained, will continue to decrease the feed output signal if motor loading remains high according to the % Hits Max. Hp Accum., following the first correction attempt by 1st Reduction % HP, but these reductions will be at the rate entered in Reduction % HP. Or if the 1st Reduction % HP resulted in too large a decrease, causing the load to drop below the lower control point of the control margin, based on the hit accumulators, the feed output signal is increased at the rate entered in Increase % HP, until such a time that the process is under control, i.e., a majority of the hits have been accumulated by the Control Accum., and the (^Max. Hp Accum./Total Accum.)<% Hits Max. Hp Accum. value.

The process in the above discussion is referred to as being in the Horsepower Control Mode, or the Primary control mode with parameters 1st Reduction % HP, Reduction % HP, Increase % HP, and Sample Time HP active.

Along with the Maximum Horsepower and 1st Reduction % HP, which acts as a primary motor overload safety, there is a secondary overload safety termed the Absolute High Horsepower Time, AHHT. If at any time HHP exceeds the MotorHHP's Absolute High Horsepower (Motor Horsepower×1.25) rating for the time AHHT at 82, the feeder is STOPPED at 84 and the process allowed to decrease on its own until such time that the present HHP falls below the Lower Control Point.

If at any time any one of the four motors have a Data Point whose magnitude and duration exceed the following:

If, HHP≧Absolute High Horsepower for t≧AHHT seconds,

Feeder is STOPPED until HHP<Lower Control Point.

Assuming that HHP has already passed MHHT and therefore has been affected by the 1st Reduction % HP, the secondary safety is to terminate feed into the system and standby until the process returns into a safe zone, in this case to below the Lower Control point. Primary control resumes.

However, if at any time the sensor input has equaled to or exceeded the Sensor Target at 86, while in Primary or Horsepower control, Sample Time switches from Sample Time HP to the Sample Time Sensor value immediately, allowing 1st Reduction % Sensor to reduce the present feed output signal at 88, and continues reducing the present feed output signal by the Reduction Sensor value if the sensor input remains equal to or beyond the Sensor Target value during any portion of the Sample Time Sensor time, and continues to reduce the feed output signal by the Reduction Sensor value as long as the Sensor input continues to remain equal to or beyond the Sensor Target value during any portion of the Sample Time Sensor value. All 1st Reduction % HP, Reduction % HP, Increase % HP, and Sample Time HP values are replaced by its sensor counterparts in the sensor control mode, or secondary control mode. The process in this condition is referred to as being in the sensor control mode.

Note that sensor control mode will remain in sensor control mode for the entire period of the Sample Time Sensor value even if the sensor input was equal to or greater than the Sensor Target for only a fraction of the Sample Time Sensor.

Or, Sensor input≧respective Sensor Target value, New Output Signal Level=Present Output Signal Level×1st Reduction Sensor %.

Or, if the LEVEL input is ON, in the meantime, the MSP, switches sample time to the Sample Time Level value, and allows 1st Reduction Level to reduce the present feed output signal, and continues reducing the present feed output signal by the Reduction % Level value, if the level input remains ON during any portion of the Sample Time Level time and continues to reduce the feed output signal by the Reduction % Level value as long as the level input continues to remain ON during any portion of the Sample Time Level period. All 1st Reduction % HP, Reduction % HP, Increase % HP, and Sample Time HP values are replaced by its Level counterparts in the Level control mode. Level is another secondary control mode. The process in this condition is referred to as being in Level control mode.

Note that level control mode will remain for the entire period of the Sample Time Level value even if the level input was ON for only a fraction of the Sample Time Level.

Or, LEVEL input is ON,

New Output Signal Level=Present Output Signal Level× 1st Reduction LEVEL %.

Feed steering returns to primary control determined by motor loading horsepower, once both Sensor and Level inputs have cleared or are below the respective Target value. If, however, control remains in the Sensor Control mode for a period equal to or longer than the Sensor Alarm Time setting from an alarm condition from any sensor at 90, the feeder is STOPPED at 92 and the process is allowed to decrease until all the Sensor Targets have been cleared.

The feeder is allowed to START again, once Sensor Targets have been cleared. However control starts at the beginning with the Initial Feed Time, Initial Feed %, and Begin Feed % settings returning back to Primary Control.

While in either Sensor or Level control modes, the process will be forced to return to Horsepower Control if motor load by MotorHHP exceeds Maximum Horsepower for t≧MHHT sec. and will remain in Horsepower Control mode until Sensor or Level control mode is again necessary, i.e., one of them or both have exceeded the respective target values. Both Sensor and Level circuits are designed only to regulate feed in the negative sense. Both reduce the feed when the process has become overburdened or over-filled, respectively. Once the overburden or the overfill is cleared, feed regulation immediately returns to motor loading or Horsepower Control mode.

Other than the feedback loop and the output signal, there are no higher level mathematics to understand, no PID tuning and configuration, no error signal processing, and no setpoints. The algorithms of the present invention will run the process, in this example a crusher system, at its most productive level without much sophistication, mathematics, high powered logic and set-up.

Though the present invention uses horsepower as the primary feed regulating variable, it is not limited to it. Pressure (PSI), temperature(F/C), material flow rate(Tons Per Hour), or other engineering units can be used in place of horsepower as the main feed steering variable. Though there may be applications that may require the use of PIDs and FUZZY, there are numerous others that can benefit from the present invention a simple, reliable, multiple sensor, multiple input, and multiple control mode alternative.

Though the present invention will process two additional inputs for Secondary Control, besides the motor(s), i.e, a Sensor input and a Level input, it also is not limited to just two. Any number of sensor inputs are possible for Secondary Control, following a redundancy of the algorithms within the present invention that affects the operation of the sensor inputs and their influence on the Primary Control inputs.

The algorithms of the present invention will continue to work just as efficiently as crusher liners wear, feed gradation changes, feed density changes, and mechanical parts begin to wear, because the output of the feed steering algorithms are not based on a mathematical/logic model of the process.

The present invention utilized motor loading as the primary sensor because it is influenced by the combined effect of each variable within the processing system. Consequently, identifying and monitoring strategic motors, within the feed replenishment system and employing the respective loads into the primary sensor inputs of the present invention, with additional secondary sensors to detect out-of-control situations, is an excellent substitute for having to identify the magnitude, velocity, direction, friction, density, rate of change, average, etc. of each variable, or the result of the collective effects, and mathematically synthesizing them. Mathematically synthesized process control is most always appreciated by its creators, seldom by its users.

Another benefit of the present invention is that it minimizes the necessity for tuning the algorithms, because again it is based on motor load which reflects the combined influence of the variables upon the mechanical system of an aggregate feed replenishment process. Motor loading data points, therefore, becomes the prime variable for the present invention. And, while motor loading will change throughout the processing work day, motor capacity to do work, horsepower rating, will not change. It is the what-to-do with the difference between these two quantities that forms the basis of the present invention. Or stated in general, the present invention is a what-to-do with the difference between a process system's maximum capacity and the process system's present operating capacity in simple how-to-do steps.

The present invention is summarized as follows:

A. Motor Capacity to do work does not change (basically Motor Horsepower and Service Factor).

B. Actual work performed, however, does change constantly. The present invention creates and processes Data Points, in Horsepower, or the work performed.

C. Monitor the difference between A and B above. And decide on how to correct it or not. And if a correction is to be made, the degree and direction of the correction.

The present invention employs common knowledge in the electrical field, basically how an electric motor reacts under load. And from this vantage point within the process world demonstrates that it is not always necessary to apply sophisticated, higher level sciences to produce an effective process controller. It replaces higher level mathematics with simple easy to understand logic.

The present invention can also be applied to regulating pressure e.g, where the pressure capacity would take the place for motor capacity. A pressure safety buffer or factor would take the place of motor service factor, which would produce the Maximum High Pressure value. Another absolute safety pressure back-up after the Maximum High Pressure, would be the Absolute High Pressure, replacing the Absolute High Horsepower parameter. And data points would consist of pressure in PSI or any other unit of measure. The system feed output signal would go to operate pump speed or the device causing pressure, in place of the variable speed conveyor belt feeder, in the crusher circuit application. Or it can be used to regulate temperature, where temperature capacity would take the place of motor capacity. A temperature safety buffer or factor would take the place of motor service factor. And data points would consist of temperature ° C. or ° F. The system feed output signal would go to operate the heater, pump or device that is causing the temperature to fluctuate, in place of the variable speed conveyor belt feeder in our crusher circuit application.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A device for controlling load on a first motor whose load is affected by a second motor, comprising:

a) a controller having a first input for being connected to a horsepower transducer connected to the first motor being monitored and an output for being connected to the second motor;

b) a program configured to receive said first input and generate said output responsive to said input;

c) said program comprising a first counter for accumulating the number of occurrences within a block of time said first input is above an upper limit, a second counter for accumulating the number of occurrences during the block of time said first input is between the upper limit and a lower limit, a third counter for accumulating the number of occurrences during the block of time said first input is below said lower limit, and a fourth counter for accumulating the total number of occurrences of said first input in said first, second and third counters during the block of time;

d) said program comprising generating a percentage of the number of occurrences in said first counter relative to the total number of occurrences, and if greater than a predetermined value, decreasing said output, thereby to slow down the second motor;

e) if said percentage is below the predetermined value, and if the number of occurrences in said second counter is less than the number of occurrences in said third counter, increasing said output, thereby to speed up the second motor; and f) if said percentage is below the predetermined value, and if the number of occurrences in said second counter is more than the number of occurrences in said third counter, maintaining said output at the present level, thereby to maintain the present speed of the second motor.

2. A device as in claim 1, wherein said upper limit is equal to the first motor horsepower rating times its service factor.

3. A device as in claim 2, wherein said lower limit is equal to the first horsepower motor rating.

4. A device as in claim 1, wherein said program includes stopping the second motor if any of the occurrences in said first counter exceeds the first motor horsepower rating times 1.25 after a predetermined time.

5. A device as in claim 1, wherein said program includes reducing said output when any of the occurrences in said first counter exceeds the first motor horsepower rating times its service factor after a predetermined time.

6. A device as in claim 1, and further comprising:

a) a second input for being connected to a sensor; and b) said program includes reducing said output if said second input exceeds a target.

7. A device as in claim 6, wherein said program includes stopping the second motor if the sensor stays above the target after a predetermined time.

8. A device for controlling a rock crusher powered by an electric motor and receiving materials from an electric variable speed feeder, comprising:

a) a controller having an input for being connected to a horsepower transducer connected to the electric motor and an output for being connected to the variable speed drive;

b) a program configured to receive said input and generate said output responsive to said input;

c) said program comprising a first counter for accumulating a first number of hits within a block of time that said first input is above an upper limit, a second counter for accumulating a second number of hits during the block of time that said first input is between the upper limit and a lower limit, a third counter for accumulating a third number of hits during the block of time that said first input is below said lower limit, and a fourth counter for accumulating a total number of hits recorded in said first, second and third counters during the block of time;

d) said program comprising generating a percentage of the first number of hits in said first counter relative to the total number of hits, and if said percentage is greater than a predetermined value, decreasing said output, thereby to slow down the second motor;

e) if said percentage is below the predetermined value, and if the second number of hits in said second counter is less than the third number of hits in said third counter, increasing said output, thereby to speed up the second motor; and f) if said percentage is below the predetermined value, and if the second number of hits in said second counter is more than the third number of hits in said third counter, maintaining said output at present level.

9. A device as in claim 8, wherein each of said hits is obtained by taking three consecutive readings from said transducer during a 300 ms period and taking the average of the readings.

10. A device as in claim 8, wherein said upper limit is equal to the electric motor horsepower rating times its service factor.

11. A device as in claim 10, wherein said lower limit is equal to said upper limit minus a predetermined amount.

12. A device as in claim 8, wherein said predetermined amount is equal to electric motor horsepower rating times its service factor minus the horsepower rating of the motor.

13. A device as in claim 8, wherein said program includes reducing said output when any of the hits in said first counter exceeds the electric motor horsepower rating times its service factor after a predetermined time.

14. A method for monitoring and adjusting the load to a first electric motor where its load is influenced by a second electric motor, comprising:

a) reading the horsepower output of the first motor;

b) grouping the readings into a first zone having a lower boundary equal to the first electric motor horsepower rating times its service factor, a second zone bounded by an upper limit equal to the lower limit of the first zone and a lower limit equal to the upper limit minus a predetermined amount, and a third zone with an upper limit equal to the lower limit of the second zone;

c) determining the percentage number of readings occurring in the first zone to the total number in the three zones during a sample period and comparing the percentage to a reference;

d) if the percentage is greater than the reference, decreasing the speed of the second electric motor to decrease the load on the first electric motor;

e) if the percentage is less than the reference and if the number of readings in the second zone is less than the number of readings in the third zone, increasing the speed of the second electric motor to increase the load on the first electric motor; and f) if the percentage is less than the reference, and if the number of readings in the second zone is greater than the number of readings in the first third zone, maintaining the speed of the second electric motor to maintain the load on the first electric motor.

15. A method for controlling the output of an electric motor to within a predetermined output zone, comprising:

a) reading the horsepower output of the motor;

b) grouping the readings into the output zone, a first zone disposed above the output range, and a second zone disposed below the output zone;

c) determining the percentage number of readings occurring in the first zone to the total number in the three zones during a sample period and comparing the percentage to a reference;

d) if the percentage is greater than the reference, decreasing the load on the electric motor;

e) if the percentage is less than the reference, and if the number of readings in the output zone is less than the number of readings in the second zone, increasing the load on the electric motor; and f) if the percentage is less than the reference, and if the number of readings in the output zone is greater than the number of readings in the second zone, maintaining the load on the first electric motor.

16. A method as in claim 15, wherein the first zone is bounded by a lower boundary equal to the horsepower rating of the motor times its service factor.

17. A method as in claim 15, wherein the output zone is bounded above by the horsepower rating of the motor times its service factor and bounded below by the horsepower rating of the motor times its service factor minus a predetermined amount.

18. A method as in claim 15, wherein the second zone is bounded above by the horsepower rating of the motor times its service factor minus a predetermined amount.

19. A device for controlling the output of an electric motor to within a predetermined output zone, comprising:

a) a controller having a first input for being connected to a horsepower transducer connected to the motor monitored and an output for being connected to a load being imposed on the motor;

b) a program configured to receive said first input and generate said output responsive to said input;

c) said program comprising a first counter for accumulating the number of occurrences within a block of time said first input is above an upper limit, a second counter for accumulating the number of occurrences during the block of time said first input is between the upper limit and a lower limit, a third counter for accumulating the number of occurrences during the block of time said first input is below said lower limit, and a fourth counter for accumulating the total number of occurrences of said first input in said first, second and third counters during the block of time;

d) said program comprising generating a percentage of the number of occurrences in said first counter relative to the total number of occurrences and if greater than a predetermined value, decreasing said output, thereby to decrease load on the motor;

e) if said percentage is below the predetermined value, and if the number of occurrences in said second counter is less than the number of occurrences in said third counter, increasing said output, thereby to increase load on the motor; and f) if said percentage is below the predetermined value, and if the number of occurrences in said second counter is more than the number of occurrences in said third counter, maintaining said output at the present level, thereby to maintain the present load on the motor.

20. A device as in claim 19, wherein said upper limit is equal to the first horsepower rating times its service factor.

21. A device as in claim 20, wherein said lower limit is equal to said upper limit minus a predetermined amount.

22. A device as in claim 19, wherein said predetermined value is about 3%–5%.

23. A device as in claim 19, wherein:

a) said upper limit is equal to the motor horsepower rating times its service factor; and b) said lower limit is equal to the motor horsepower rating.

* * * * *